United States Patent [19]

Nill, Jr.

[11] Patent Number: 5,193,390
[45] Date of Patent: Mar. 16, 1993

[54] EARLY WARNING ROOF VENT

[76] Inventor: Andrew J. Nill, Jr., 84 W. Pulaski Rd., Huntington, N.Y. 11746

[21] Appl. No.: 702,406

[22] Filed: May 20, 1991

[51] Int. Cl.⁵ ............................................. G01W 1/00
[52] U.S. Cl. ................................................. 73/335.02
[58] Field of Search ................ 73/335, 336, 336.5, 73/40, 865.8, 335.02-335.05, 64.56; 340/602, 605, 870.03

[56] References Cited

U.S. PATENT DOCUMENTS

| | | | |
|---|---|---|---|
| 2,880,682 | 5/1959 | Martin | 73/335 |
| 2,932,199 | 4/1960 | Rueger | 73/335 |
| 3,984,947 | 10/1976 | Patry | |
| 4,052,667 | 10/1977 | Schwartz | |
| 4,110,945 | 9/1978 | Sheahan | |
| 4,432,273 | 2/1984 | Devitt | 136/291 |
| 4,598,273 | 7/1986 | Bryan, Jr. et al. | |
| 4,723,109 | 2/1988 | Sheahan | |
| 4,924,174 | 5/1990 | Sheahan | |

Primary Examiner—Robert Raevis
Attorney, Agent, or Firm—Galgano & Belkin

[57] ABSTRACT

A roof vent for use on a flat roof incorporating a moisture detector for the early detection of a roof leak. The vent includes a removable cap in which the moisture measuring instrument is located. A sensing element is located within the roof and connected by electrical leads to the measuring instrument. Roof vents incorporating this invention may be arranged in a pattern on the roof to help identify the location of the leak. A radio transmitter may be included in the vents so that the vents may be monitored remotely. Each vent may transmit a distinctive signal to provide the identification of its location.

7 Claims, 3 Drawing Sheets

EARLY WARNING ROOF VENT

BACKGROUND OF THE INVENTION

The present invention relates to a roof vent and more particularly to a roof vent with provision to provide an early warning of a roof leak.

Roof system failures can and do occur anytime during their predicted watertight life expectancy as a result of vandalism, damage by maintenance personnel, acts of nature such as wind, hail, etc., poor workmanship, and premature material failures.

Unfortunately, a failure in the watertight integrity of a roof is usually not discovered until it has done considerable damage to surrounding roof area, if not the entire roof system. This extensive damage, consisting of saturation of roof substrates, i.e., insulation board, roof membrane, and structural deck materials, happens most often in reroofing projects where an existing (old) roof prevents water intrusion from entering and being detected in the interior of the building. Watertight roof decks consisting of poured concrete, gypsum, for example, also waterproof vapor barriers will also cause leaks to go undetected or give false locations of leak source in reroofing and new roof installations.

There have been previous efforts to provide for the early detection of roof leaks. Some of these are disclosed in the following United States Patents.

U.S. Pat. No. 3,984,947 shows a conventional roof vent.

U.S. Pat. No. 4,052,667 discloses a moisture meter for use in a flower pot using measurement of conductivity of the soil to indicate the moisture content.

U.S. Pat. No. 4,110,945 describes a roof installation for locating water leakage points. In this arrangement, a plurality of water detectors are positioned under the water-impermeable membrane of a roof to determine the general area of a leak.

U.S. Pat. No. 4,598,273 illustrates a leak detection system for roofs in which a plurality of sensors are placed beneath the water impermeable portion of a roof structure and a remote signalling system is provided.

U.S. Pat. No. 4,723,109 discloses the use of a water leak detector incorporated into a roof hold down device.

U.S. Pat. No. 4,924,174 describes also the use of a water leak detector incorporated into a roof hold down device.

The present invention is not taught in any of the aforementioned patents.

SUMMARY OF THE INVENTION

In this invention moisture detection apparatus is incorporated into roofing vents and provision is made for routine inspection or remote signalling utilizing solar power or batteries to indicate not only the existence of a leak but also its location.

This invention is designed primarily for use on commercial, industrial, and institutional buildings having large roof areas. Roof vents are commonly employed to prevent moisture vapor from becoming trapped in the roofing system. They help to prevent blistering, cracking and crazing of the membrane which seals the roof against leakage of water.

A roof vent incorporating the principles of this invention includes a removable portion at the top containing the moisture meter and sending apparatus, if used. Also, in one preferred embodiment of this invention there would be included a display so that the roof vents incorporating this invention can be inspected on a routine basis. In addition, provision may be made for removal of a top portion to permit visual inspection or even the taking of a sample of the materials in question. In another embodiment of this invention, a number of roof vents can be arranged in a grid system and each provided with a radio to beep the grid location in the event moisture is detected.

It is thus a principal object of this invention to provide a novel roof vent containing means for detecting the presence of moisture and a roof venting system for giving an early warning of the leak and also its location.

Other objects and advantages of this invention will hereinafter become obvious from the following description of the preferred embodiments of this invention.

DESCRIPTION OF THE PREFERRED EMBODIMENTS

Figure 1:
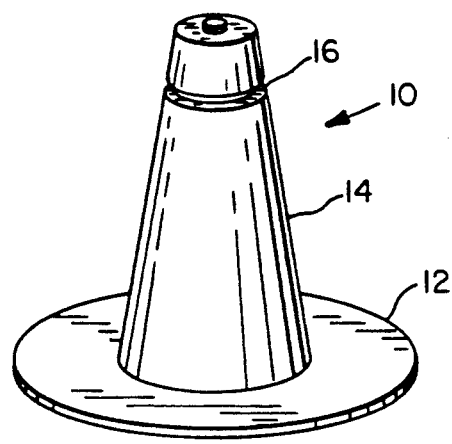
FIG. 1 is an isometric view of a typical roof vent now in use.

Referring to FIG. 1, a typical roof vent 10 comprises a flange 12 with a conically spaced superstructure 14 provided with an annular opening 16 for venting the roof space between the deck and the moisture barrier.

Figure 2:
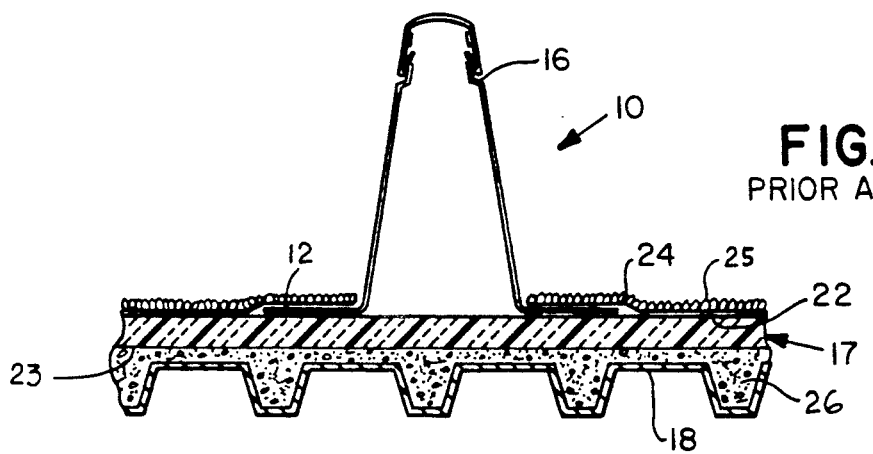
FIG. 2 shows in partial section a typical installation for the roof vent shown in FIG. 1.

As seen in FIG. 2, the interior of vent 10 mounted on roof 17 is open to the space between deck 18 and membrane 22. Flange 12 is on top of waterproof membrane 22, and flashing 24 is provided on top to seal the space around flange 12. On flashing 24 and membrane 22 is provided gravel, tar, ballast, etc. 25 to build up the roof structure as is understood in the art. A vapor barrier 23 is located just above deck 18.

Filling the space between deck 18 and membrane 22 of roof 17 is lightweight insulating concrete 26, and other materials including additional layers of various materials according to the requirements of the particular roof.

Figure 3:
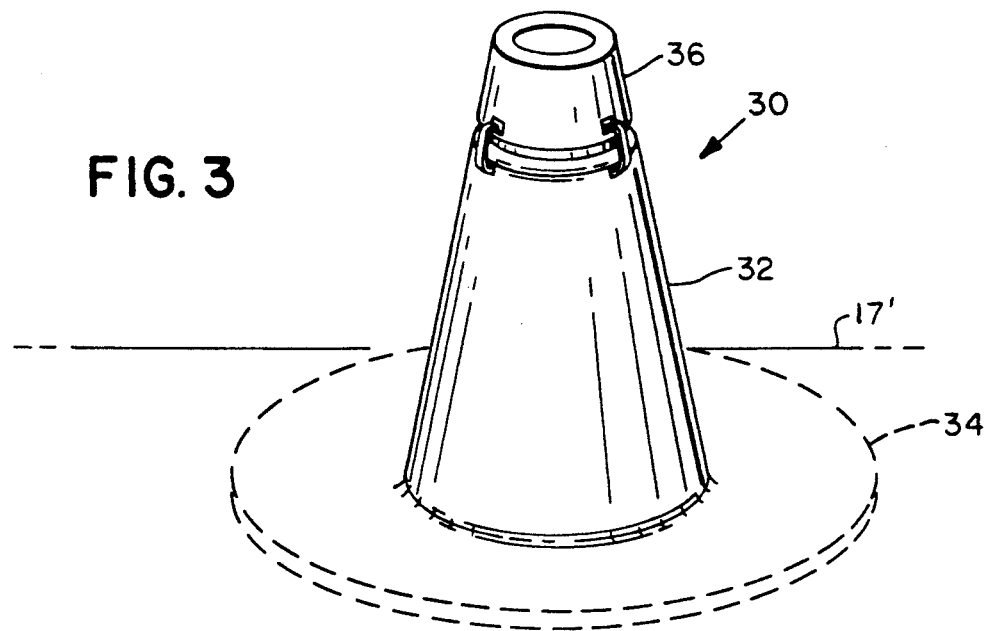
FIG. 3 is an isometric view of a roof vent incorporating the principles of this invention.
Figure 4:
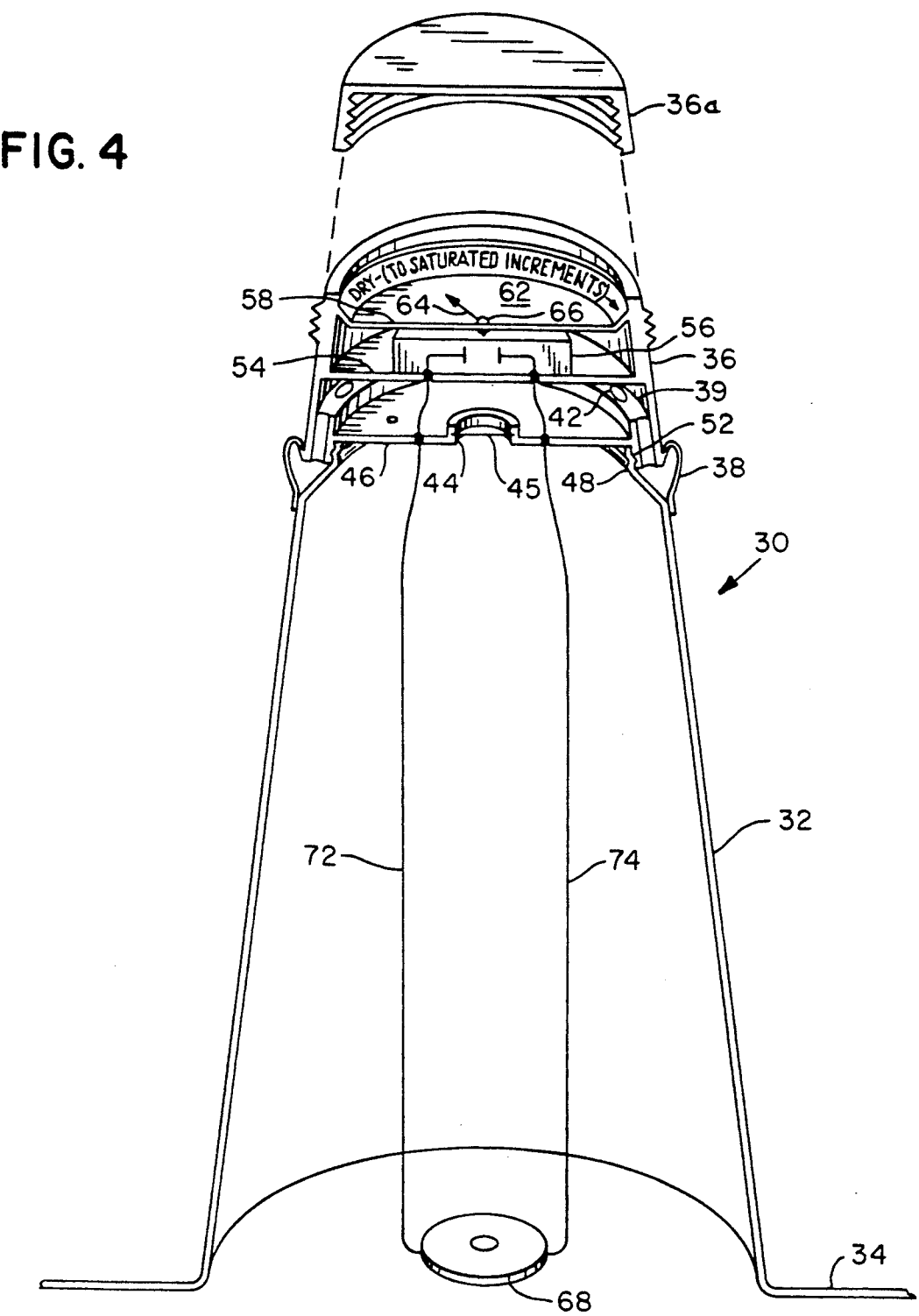
FIG. 4 is a view similar to FIG. 3 partially schematic and cut away to show details of construction.
Figure 5:
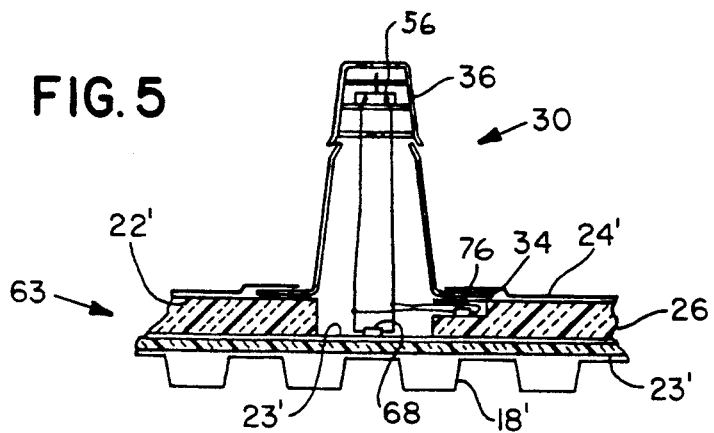
FIG. 5 shows partially schematically in section a typical installation on a rebuilt roof vent shown in FIG. 3.

In order to detect the presence of moisture within roof 17 between deck 18 and membrane 22, a roof vent 30 incorporating the principles of this invention, shown in FIGS. 3, 4 and 5, is employed. Roof vent 30 consists of a conical section 32 with a flange 34 on the bottom, and a removable cap 36 with a dust cover 36a on the top held by clamps 38.

Inside of cap 36 there is provided a shoulder 39 with openings 42 to permit venting of roof 17 through an opening 44 in a lower platform 46. Within opening 44 is a diaphragm 45 or other mechanism that permits moisture to vent out but will not permit moisture to enter. Such devices are known in the art. Sealing between section 32 and cap 36 is obtained by way of ridged neck 48 of section 32 and the ridged annular portion 52 of shoulder 39. Openings 42 may contain one way or two way valves, or baffling as is understood in the art.

On an intermediate platform 54 spaced above lower platform 46 is a moisture sensing device 56 which will be more particularly described later. Upper platform 58 spaced above intermediate platform 54 forms a dial face 62 on which is located a needle 64 controlled by moisture sensing device 56 through an opening 66 which would be sealed against water leakage as is understood in the art. Dial face 62 can be waterproof and unbreakable.

Dial face 62 is provided with readings as indicated to show the degree of moisture sensed by device 56 as will be more particularly described below. Dust cover 36a is employed over cap 36 to prevent water or dust from collecting on dial face 62.

Roof 63 shown in FIG. 5 shows a typical application of this invention where a second roof has been added because of water damage. Roof 63 consists of deck 18' with a vapor barrier 23', insulation 26' and waterproof membrane 22'. Flange 34 of vent 30 is on top of membrane 22, and is covered over and sealed by flashing 24'.

Within roof 63 is placed a moisture sensing element 68 connected by insulated leads 72 and 74 to sensing instrument 56. Jacks and loops may be incorporated in leads 72 and 74 to permit cap 36 to be removed. Water sensing element 68 may be of one of the types shown in U.S. Pat. No. 4,110,945, 4,598,273, and 4,723,109 which are incorporated by reference for the detection of the presence of water above barrier 23', or may comprise a porous material in which a probe of the type shown in U.S. Pat. No. 4,052,667 for the measurement of the degree of moisture present may be used. For example, sensing element 68 might be a water activated battery as described in U.S. Pat. No. 4,598,273 which will generate electricity when becoming wet, which would activate instrument 56 to produce a signal. A second sensing element 76 in parallel with element 68 may be located on insulation 26 to detect the presence of moisture under membrane 22'.

Figure 6:
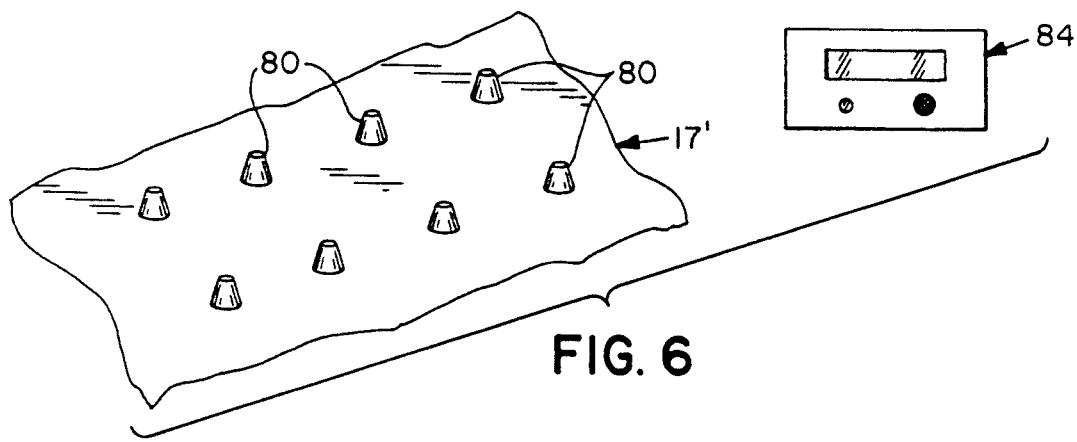
FIG. 6 is a typical arrangement of roof vents incorporating the present invention and a receiver to display information showing the presence of moisture.
Figure 7:
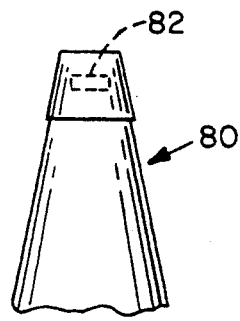
FIG. 7 is a detail of one of the roof vents shown in FIG. 6.

The present invention may also be employed not only to detect the presence of water in a roof, but also to provide the location of a leak. As seen in FIGS. 6 and 7, roof vents 80 otherwise identical to vents 30 may be arranged in a grid pattern on roof 17' but each vent 80 would include a moisture sensor 82 incorporating a radio transmitter to send a radio wave in the form of a beep characteristic of its location in the grid so that monitor 84 would instantly indicate by a sound alarm/light and/or a display the presence and location of the leak. Typically, monitor 84 would be located in a control or service area for the building.

For example, a typical signal could be 1.A.32 where numeral 1 is the grid as shown on a map of the area, A is the building, and 32 is the vent number. Monitor 84 can be located in a central room of a building and a group of buildings can be monitored.

From the preceding description it is seen that there has been provided a roof vent which is uniquely capable of the early detection of a water leak in a roof, and yet is an economic and practical alternative to elaborate and expensive systems capable of accomplishing the same purpose.

While only certain preferred embodiments of this invention have been described it is understood that many variations of this invention are possible without departing from the principles of this invention as defined in the claims which follow.

What is claimed:

1. A vent for and in combination with a roof, said roof comprising deck means supporting layers of insulation, a waterproof membrane, and other roofing materials, said vent comprising a hollow member having a flange on the bottom thereof mounted on said roof covering an opening through said membrane, means sealing said flange on said roof to prevent leakage under said flange into said opening, removable cap means enclosing the top of said hollow member and including a lower platform having an opening therethrough, clamp means for releasable holding said cap means on said hollow member, said cap means including vent openings for air access into said hollow member for permitting unforced circulation of air into and out of said vent, said cap means further including a removable dust cover, an intermediate platform above and spaced from said lower platform, moisture indicating instrument means mounted on said intermediate platform, an upper platform spaced above said instrument means having means readable from outside of said roof vent when said dust cover is removed for indicating the presence of moisture and operably connected to said instrument means, first sensing means located within said roof placed below said waterproof membrane for sensing the presence of water, and electrical lead means for connecting said sensing means to said instrument means for delivering a signal to said readable means for indicating the presence of water below said membrane in said roof, said vent thereby simultaneously venting said roof through natural air circulation and detecting the presence of water below said membrane.

2. The combination of claim 1 wherein said readable means comprises a dial face and a needle actuated by said instrument means.

3. The combination of claim 2 having a second sensing means in parallel with said first sensing means located under said flange to detect the presence of water within said insulation below said membrane.

4. The combination of claim 2 wherein a plurality of said vents are arranged on said roof so that the location of said leak can be identified.

5. The combination of claim 4 wherein said vents including radio transmission means for remotely indicating the presence of a leak.

6. The combination of claim 5 wherein each vent upon detecting a leak transmits a distinctive signal thereby remotely pinpointing the location of the leak.

7. A vent for and in combination with a roof, said roof comprising deck means supporting layers of insulation, a waterproof membrane, and other roofing materials, said vent comprising a hollow member having a flange on the bottom thereof mounted on said roof covering an opening through said membrane, means sealing said flange on said roof to prevent leakage under said flange into said opening, removable cap means enclosing the top of said hollow member and including a lower platform having an opening therethrough, clamp means for releasable holding said cap means on said hollow member, said cap means including vent openings for permitting unforced circulation of air into and out of said vent, an intermediate platform above and spaced from said lower platform, moisture indicating instrument means mounted on said intermediate platform, an upper platform spaced above said instrument means having means readable from outside of said roof vent for indicating the presence of moisture and operably connected to said instrument means, first sensing means located within said roof placed below said waterproof membrane for sensing the presence of water, and electrical lead means for connecting said sensing means to said instrument means for delivering a signal to said readable means for indicating the presence of water below said membrane in said roof, said vent thereby simultaneously venting said roof through natural air circulation and detecting the presence of water below said membrane.

* * * * *